(12) United States Patent
Schafer et al.

(10) Patent No.: US 10,482,494 B2
(45) Date of Patent: Nov. 19, 2019

(54) STEERING DISTRIBUTIONS FOR CONNECTIONS FROM ONLINE CAMPAIGNS OF UNIQUELY IDENTIFIABLE OBJECTS (UIOS) BASED ON PREDICTED DISTRIBUTIONS

(71) Applicant: Long Tail Ventures Inc., Winnipeg (CA)

(72) Inventors: Lance Timothy Schafer, Winnipeg (CA); Jeremy Ryan Charney, Kelowna (CA); Leonard Short, Chicago, IL (US); Robert Vucic, Ontario (CA); Denise Feulner, Chicago, IL (US)

(73) Assignee: Lotlinx Canada Manitoba, Inc., Winnipeg (CA)

( * ) Notice: Subject to any disclaimer, the term of this patent is extended or adjusted under 35 U.S.C. 154(b) by 773 days.

(21) Appl. No.: 15/058,127

(22) Filed: Mar. 1, 2016

(65) Prior Publication Data
US 2017/0148054 A1 May 25, 2017

Related U.S. Application Data

(63) Continuation-in-part of application No. 13/687,962, filed on Nov. 28, 2012, now Pat. No. 10,089,649, which is a continuation-in-part of application No. 13/555,987, filed on Jul. 23, 2012, now abandoned, which is a continuation-in-part of application No. 13/523,703, filed on Jun. 14, 2012, now abandoned.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0249* (2013.01); *G06Q 30/0273* (2013.01); *G06Q 30/0277* (2013.01); *G06Q 30/0643* (2013.01)

(58) Field of Classification Search
CPC .......... G06Q 30/0242; G06Q 30/0244; G06Q 30/0246; G06Q 30/0249
See application file for complete search history.

(56) References Cited

U.S. PATENT DOCUMENTS

| | | |
|---|---|---|
| 7,076,443 B1 | 7/2006 | Emens et al. |
| 7,107,227 B1 | 9/2006 | Bezos et al. |
| 7,945,486 B2 | 5/2011 | Inghelbrecht et al. |
| 7,966,210 B2 | 6/2011 | Hall et al. |

(Continued)

OTHER PUBLICATIONS

International Search Report and Written Opinion for PCT/IB2017/000152 dated Jun. 27, 2017, 11 pages.

*Primary Examiner* — Meredith A Long
(74) *Attorney, Agent, or Firm* — Patent Law Works LLP (57) ABSTRACT

Connections (e.g., click-throughs) for online campaigns are steered. A plurality of UIOs and parameters for configuring a campaign (e.g., advertisement campaign) for the plurality of UIOs is received. UIOs comparable to each of the plurality of UIOs of the campaign are automatically identified and displayed in as an array of options that can be selected for more detailed information. A distribution of connections is predicted from resulting from displays for the plurality of UIOs of the campaign, based on historical information of connections for the identified comparable UIOs.

17 Claims, 10 Drawing Sheets

(56) References Cited

U.S. PATENT DOCUMENTS

| | | |
|---|---|---|
| 8,027,977 B2 | 9/2011 | Thambiratnam et al. |
| 8,239,273 B1 | 8/2012 | Marshall et al. |
| 8,239,494 B2 | 8/2012 | Lunt et al. |
| 8,386,320 B2 | 2/2013 | Hayes et al. |
| 8,447,702 B2 | 5/2013 | Nicks |
| 8,473,349 B1 | 6/2013 | Manber et al. |
| 8,566,166 B1 | 10/2013 | Jones et al. |
| 8,700,462 B2 | 4/2014 | Collins |
| 8,725,558 B1 | 5/2014 | Lee et al. |
| 2004/0093327 A1 | 5/2004 | Anderson et al. |
| 2007/0011050 A1 | 1/2007 | Klopf et al. |
| 2007/0027771 A1 | 2/2007 | Collins et al. |
| 2007/0055569 A1 | 3/2007 | Subramanian et al. |
| 2007/0239531 A1 | 10/2007 | Beaufays et al. |
| 2007/0260516 A1 | 11/2007 | Schoen et al. |
| 2007/0294140 A1 | 12/2007 | Bezos et al. |
| 2008/0140530 A1 | 6/2008 | Van Luchene et al. |
| 2008/0270228 A1 | 10/2008 | Dasdan |
| 2008/0275863 A1 | 11/2008 | Dominowska et al. |
| 2009/0019008 A1 | 1/2009 | Moore et al. |
| 2009/0031216 A1 | 1/2009 | Dressel et al. |
| 2009/0043649 A1 | 2/2009 | Wright et al. |
| 2009/0125719 A1 | 5/2009 | Cochran et al. |
| 2009/0132363 A1 | 5/2009 | Powell et al. |
| 2009/0254512 A1 | 10/2009 | Broder et al. |
| 2009/0254635 A1 | 10/2009 | Lunt |
| 2010/0057559 A1 | 3/2010 | Wilf et al. |
| 2010/0082472 A1 | 4/2010 | Cheung |
| 2010/0153424 A1 | 6/2010 | Portlock et al. |
| 2010/0161408 A1 | 6/2010 | Karson et al. |
| 2010/0257049 A1 | 10/2010 | Flombaum et al. |
| 2010/0262488 A1 | 10/2010 | Harrison et al. |
| 2010/0299190 A1 | 11/2010 | Pratt et al. |
| 2011/0184816 A1 | 7/2011 | Jones et al. |
| 2011/0202423 A1 | 8/2011 | Pratt et al. |
| 2011/0270697 A1 | 11/2011 | Sunkada |
| 2011/0276389 A1 | 11/2011 | Kulkarni et al. |
| 2011/0276394 A1 | 11/2011 | Chan |
| 2012/0130816 A1 | 5/2012 | Sakamoto |
| 2012/0197981 A1 | 8/2012 | Chan |
| 2012/0253926 A1* | 10/2012 | Chen ............... G06Q 10/06 705/14.49 |
| 2014/0012659 A1 | 1/2014 | Yan |

* cited by examiner

STEERING DISTRIBUTIONS FOR CONNECTIONS FROM ONLINE CAMPAIGNS OF UNIQUELY IDENTIFIABLE OBJECTS (UIOS) BASED ON PREDICTED DISTRIBUTIONS

CROSS-REFERENCES TO RELATED APPLICATIONS

This application claims priority as a continuation-in-part to U.S. patent application Ser. No. 13/523,703, by Schafer et al., entitled ATTRIBUTING INDIVIDUAL PPC VALUES FOR ONLINE ADVERTISING OF UNIQUELY IDENTIFIABLE OBJECTS, and filed on Jun. 14, 2012; claims priority as a continuation-in-part to U.S. patent application Ser. No. 13/555,987, by Schafer et al., entitled REAL-TIME ADVERTISING OF UNIQUELY IDENTIFIABLE OBJECTS AMONG THIRD PARTY SEARCH RESULTS, and filed on Jul. 23, 2012; and further claims priority as a continuation-in-part to U.S. patent application Ser. No. 13/687,962, by Schafer et al., entitled ADVERTISING OF UNIQUELY IDENTIFIABLE OBJECTS, and filed on Nov. 28, 2012, the contents of each being hereby incorporated by reference in its entirety.

FIELD OF THE INVENTION

The invention relates generally to online connections from UIOs, and more specifically, to steering distributions for connections for online campaigns.

BACKGROUND

Online advertisements are important revenue generators for publishers. As consumers turn away from traditional media to spend more time on the Internet, and increase spending there as well, online advertisements are becoming even more critical. One key concern for marketers is how to effectively target online advertisements to consumers that are interested and likely to buy the specific or even uniquely identifiable product or service, or even inquire or pay attention to the pitch.

When a marketer configures a marketing campaign to a server, a PPC value is assigned to advertisements to entice publishers to prominently display the advertisements amongst other published content. However, a marketer may not know what PPC values (or other values drawn from user interaction) to start out with. Also, a marketer can have an overall budget that needs to be allocated among several advertisements. An inefficiently configured marketing campaign is likely not an effective one.

What is needed is a technique for steering distributions for connections for campaigns of uniquely identifiable objects (UIOs) based on predicted distributions. The technique should also update initial weightings dynamically in response to actual connection data as it comes available.

SUMMARY

To meet the above-described needs, methods, computer program products, and systems for steering distributions of connections from campaigns of UIOs based on predicted distributions.

In one embodiment, a plurality of UIOs and parameters for configuring a campaign for the plurality of UIOs is received. One example is an advertisement campaign for click-throughs to a specific page on a car dealer web site which as more-detailed information about the vehicle. UIOs comparable to each of the plurality of UIOs of the advertisement campaign are automatically identified. A distribution of connections from a web site displaying a UIO to a web site offering the UIO (e.g., hyperlink clicks) is predicted for the plurality of UIOs of the campaign, based on historical information of connections (e.g., connection velocity or connection volume) for the identified comparable UIOs.

In another embodiment, an initial connection weighting is automatically generated for each of the plurality of UIOs, wherein the initial weighted score affects how often an associated UIO is displayed as part of an advertisement. The display can be singular or part of an array of options, and weighting can affect placement within the array of options (e.g., higher up on the list). The plurality of UIOs are sent for display on computing devices according to the initial weighted scores.

In yet another embodiment, feedback is received of actual connections for each of the plurality of UIOs for generating an actual connection distribution. Responsive to the actual connection distribution, at least part of the initial connections weights are adjusted based on a comparison of the actual advertisement connection distribution to the predicted connection distribution. The plurality of UIOs continue to be sent for display on computing devices according to the adjusted weighted scores. Another embodiment considers not only the campaign budget and connections monitored for the internal system, but also campaigns and resulting connections observed for external systems. As a result, connection weights can be adjusted in response to the success or failure of connections from external campaigns.

Advantageously, UIO advertisements are weighted even before connection data is available. Weighting is dynamically adjusted based on real-time connection data on once available.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for steering distributions for connections from campaigns (e.g., advertisement campaigns) of UIOs based on predicted distributions. In general, a uniquely identifiable object can be individually distinguished over all other objects, and even those that have nearly identical manufacturing specifications, by a unique identification code (e.g., a serial number or other type of distinguishing data).

In one exemplary embodiment, an automobile appears on a web site, such as Craigslist.com. Metadata in the web page, or content displayed in the web page, provides a VIN number assigned to the automobile. A client identifies the VIN number for submission to a remote server that stores online advertisements. As a unique identifier, the VIN number can reveal characteristics of the automobile such as model, make, year, and the like. The characteristics can be indicative of certain types of owner categories that are useful for advertising impressions. Therefore, the remote server returns PPC (pay per click) sponsored online advertisements associated with the VIN number, specific to that VIN itself, and any related ads to display along with the uniquely identified object, such as a related vehicles or affinity offerings (i.e., related goods are services that are not necessarily unique).

In another exemplary embodiment, as set forth more fully in U.S. application Ser. No. 13/555,987 an automobile marketplace web site is a publisher that hosts direct revenue-generating online advertisements or free advertisements submitted directly by sellers. A search engine integrated within the website returns search results to user queries for specific types of automobiles as a SERP (search engine results page). To augment the results, the automobile marketplace web site can also list third-party sponsored advertisements or search results within or along with the other search results. As a result, the automobile marketplace web site can generate additional revenue from connections (e.g., click-throughs to the third party sponsored search results of uniquely identifiable objects, or exposure of connection data).

As used herein, the terms "third party" and "remote" are relative. From a publisher point of view, an advertisement server is a remote, third party. From an advertisement server point of view, the publisher is a remote, third party. The point of views and above terms are used interchangeably herein.

Also, please note that the disclosure herein often refers to automobiles solely for the purposes of thoroughly delineating a preferred embodiment. However, one of ordinary skill in the art will recognize, given the disclosure, that the techniques can be applied to other individually distinguishable products such as real estate or artwork. Further, services such as dentistry can be uniquely identified by time, location and/or a particular dentist within an office.

I. Connection Steering Systems (FIGS. 1-2)

Figure 1:
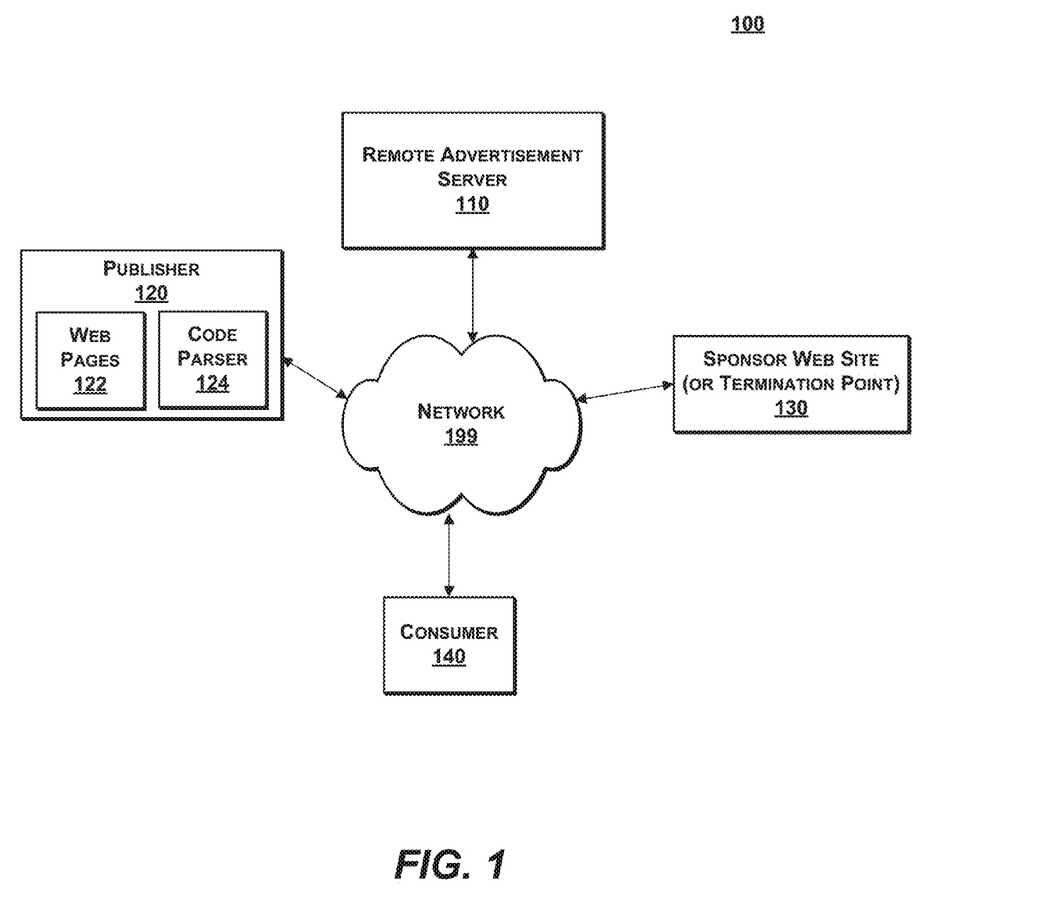
FIG. 1 is a high-level block diagram illustrating a system for steering distributions for connections for campaigns (e.g., advertisement campaigns) of UIOs based on predicted distributions, according to one embodiment.
Figure 2:
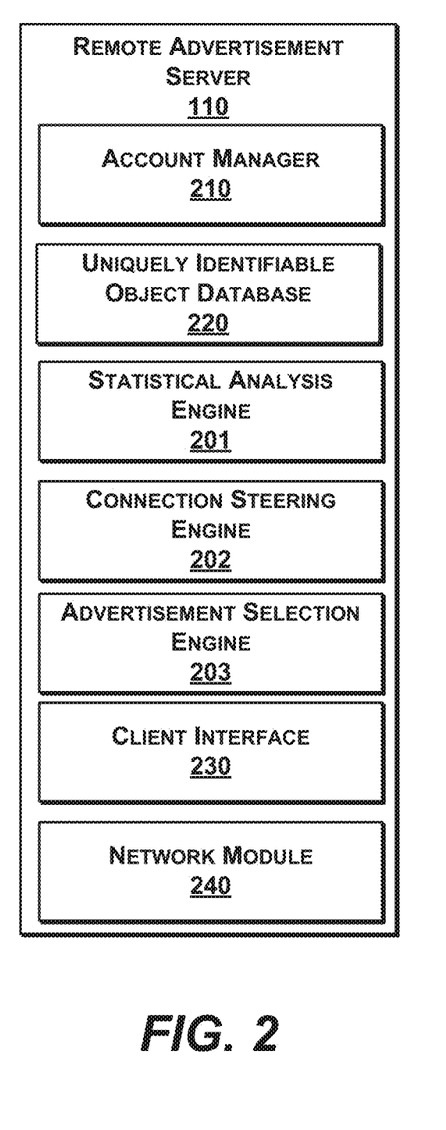
FIG. 2 is a more detailed block diagram illustrating a remote advertisement server (or connection management server) of the system of FIG. 1, according to one embodiment.

FIG. 1 is a high-level block diagram illustrating a system 100 for steering distributions for advertisement connections for advertisement campaigns of UIOs based on predicted distributions, according to one embodiment. The system 100 comprises a remote advertisement server 110 (or more generally, a connection management server), a publisher 120, a sponsor web site (or termination point) 130, and a consumer 140. The components can be coupled to a network 199, such as the Internet, a local network or a cellular network, through any suitable wired (e.g., Ethernet) or wireless (e.g., Wi-Fi or 3G) medium, or combination. Other embodiments of communication channels are possible, including hybrid networks. Additional network components can also be part of the system 100, such as firewalls, virus scanners, routers, switches, application servers, databases, and the like.

The remote advertisement server 110 can serve advertisements according to a predicted advertisement connection distribution. For instance, past listings of vehicles having certain characteristics can help estimate future listings of vehicles with similar characteristics. One embodiment of the remote advertisement server 110 responds to a feedback of actual connection data. In more detail, an actual distribution of advertisement connections is compared to a targeted distribution of advertisement connections. The targeted distribution can be received from a marketer, or can be preloaded in server software. As a result, some UIOs can be sent for display more or less often in order draw more or fewer click-throughs, relative to other UIOs of an advertising campaign. Some UIOs have higher click-through rates, and as a result, require fewer impressions until sold. So a flashy vehicle, such as a red corvette, may naturally draw more click-throughs than an old beat up truck.

In one embodiment, a weighted score is calculated in order to increase or decrease the number of connections to UIOs. A vehicle that naturally draws fewer click-throughs can be assigned a higher weighting and get served more often. The weighting of an embodiment is relative to other vehicles, or other UIOs, of a particular advertisement campaign. Consequently, more exposure of one advertisement results in less exposure of one or more other advertisements. In one embodiment, weighting adjusts predicted distributions from historical data to target distributions preferred by a marketer. In another embodiment, weighting adjusts actual distributions to target distributions. In still another embodiment, weighting adjusts actual distributions to predicted distributions. For instance, marketer may be paying for a specific guarantee of service as predicted and computing resources can be conserved when outperforming the predictions, and computing resources can be reserved as needed. Adjustments can occur in real-time, periodically, or responsive to reaching a threshold.

Another embodiment considers not only the campaign budget and connections monitored for the internal system, but also campaigns and resulting connections observed for external systems. As a result, connection weights can be adjusted in response to the success or failure of connections from external campaigns. External connection statistics can be sent from a daemon that intercepts feed data, by providing log-in information to external systems, by pushing data between systems, available third party data sources, and by any other appropriate technique of sharing statistics.

Yet another embodiment, adjusts weighting not only responsive to the number of connections but also in consideration of the quality of connections. A click-through to a web site that is immediately discontinued has less value than a click-through to a web site that results in a 10-minute view or a sale. Data for tracking quality of connections can be obtained from daemons on the marketer web site, apps running on the client, inter-system compatibility, or the like.

In some embodiments, the remote advertisement server 110 stores online advertisements related to uniquely identifiable objects. The online advertisements can be sponsored advertisements having a PPC and campaign budget set by marketers. The online advertisements can include direct marketing of an object, or indirect marketing of related advertisements. For example, a vehicle can be marketed by a used car dealer, and peripheral products to the vehicle, such as CarFax reports, offers to buy your existing car for cash, finance, insurance, new car options, used vehicle parts, and oil change locations can be marketed to potential buyers of the vehicle. Characteristics can be associated with the peripheral products to allow matching to characteristics of objects.

The remote advertisement server 110 can be a computer, a set of distributed computers, a server, a virtual server, or the like. The remote advertisement server 110 can be operated by an entity that is independent from marketers of UIOs and publishers of UIOs, thereby providing an advertising exchange.

More detailed embodiments of the remote advertisement server 110 are discussed in more detail below in association with FIG. 2.

The publisher (or third party) 120 can be a computer, a set of distributed computers, a server, a virtual server, or the like. Examples of the publisher include general search engines (e.g., Google or Bing), marketplaces with vertical search engines (e.g., Cars.com or Amazon.com), marketers, bloggers, news sources, classified publishers, social media providers, third parties, and the like.

Web pages 122 and an optional code parser 124 are included in the illustrated embodiment of the publisher 120. However, in other embodiments, the components are not integrated, and can be owned and/or operated by a third party. The web pages 122 can be static or dynamic web pages that are incorporated to a web site available at a particular domain, or be individual or sub-groups of pages. The content of web pages 122 can relate to commercial products offered by the publisher 120, such as vehicles or resold products. The content of web pages 122 can also be blogs, news articles, social media, multimedia such as images or video, or any other type of content suitable for online viewing. Search functionality can be included. One of more online advertisements are included with a web page. The online advertisements can be provided in real time (e.g., for dynamically generated web pages), or can be pre-processed in batch (e.g., for static web pages).

The code parser 124 can be a process, daemon, operating system module, other application, or hardware that checks the web pages 122 for unique identifiers. In response, the unique identifier is used to retrieve online advertisements for insertion to web pages. In other embodiments, a code parser 124 is not necessary, such as when online advertisements are directly associated with uniquely identifiable objects by a marketer.

The sponsor web site (which is an exemplary termination point) 130 can be an online inventory of products or services of a marketer. In some embodiments, a search engine sends a consumer to the sponsor web site 130. In the case of advertisements based on a search query, the sponsor web site 130 can be displayed within code of a SERP web page controlled by the search engine. Alternatively, a new tab or browser instance can be spawned. Note that the sponsor web site 130 is just one example of a connection medium associated with an advertisement. Connection mediums can include a termination point for automatically forwarding a user, or mere connection data for the user to select how to connect. Exemplary connection mediums include an SMS message, click to expose a complete telephone number, click to initiate a telephone call, an address that can include directions, click for navigation, a VDP (vehicle description page) or other deep link, and the like.

The consumer (or customer or user) 140 can be an individual, a corporate entity, an automated process, or the like, using a computing device to use the third-party web site. The computing device can be mobile (e.g., a smartphone) or stationary. The consumer 140 can submit queries and click-on sponsored advertisements. For example, the consumer 140 can select a deep hyperlink from a UIO advertisement that is connected to a specific white-colored Nissan Pathfinder located at a specific dealership nearby to the consumer 140. Aggregate data can be collected for a number of times a UIO is shown to consumers, a number of times consumers click on a hyperlink for a UIO, a type of hyperlink that is clicked among several types of hyperlinks (e.g., other types of hyperlink engagements include a web page hyperlink, an SMS hyperlink, an e-mail hyperlink, a navigation web page hyperlink, or the like), and other types of data. Some types of client engagement outside of click-throughs can occur including hover-overs, Java interactions, gestures, user reactions, future HTML features, and the like. The consumer data can be raw data or pre-processed data.

FIG. 2 is a more detailed block diagram illustrating a remote advertisement server 110 of the system 100 of FIG. 1, according to one embodiment. The remote advertisement server 110 includes a statistical analysis engine 201 and a connection steering engine 202 which acts as a controller for the process, in some embodiments. Peripheral components include an advertisement selection engine 203, an account manager 210, a uniquely identifiable object database 220, a search engine interface 230, and a network module 240. The components can be implemented in hardware, software, or a combination of both.

The statistical analysis engine 201 and the connection steering engine 204 are the core components of one implementation. In cooperation, a predicted distribution helps in a cold-start situation for a particular UIO by leveraging historical data for similar UIOs. Histograms can be generated and used to model past data. A resulting statistical model quantifies the likelihood of a desired amount of exposure. The exposure is measured by click-throughs to deep links to a page with detailed information about a UIO, or by other measurements. The connection steering engine 202 calculates and/or applies weighting based on predicted and/or actual connections. One case starts out in a first mode by using predicted connections, shifts to a second mode by using a hybrid of rolling feedback for actual connections, and finally shifts to a third mode of using actual connections to drive future weighting.

The advertisement selection engine 203 identifies a UIO advertisement and accesses memory at a corresponding location to retrieve an advertisement for download to a publisher, according to the weighting. Without modification by weighting, advertisement selection can be based on a random model, a round-robin or other parity model, a guaranteed service level, or the like. The weighting either completely or partially modifies the preexisting selection algorithms. A digital image file can be sent from the remote advertisement server 110 for display at the publisher 120.

The account manager 210 is an interface for a marketer to manage online advertisements. Settings can be global to the account, or particular to a uniquely identifiable object. Exemplary settings include a PPC (pay-per-click) value, an overall budget (e.g., a maximum spending allowance, a maximum number of clicks), a per uniquely identifiable object budget, a per uniquely identifiable object bid amount, a bid geography, a fallback termination point, and a marketing agency. In some embodiments, the account manager 210 logs click-throughs. A marketer may access the account manager 210 using a viewer such as a web browser or a local client or API.

The uniquely identifiable object database 220 stores data entered by a marketer about uniquely identifiable objects through the user interface, and stores data harvested from external data sources. For instance, a relational database stores a record for each uniquely identifiable object. Other data stored can include a uniquely identifiable object key (e.g., a unique identification code, such as a serial number, a VIN, or the like), a marketer identification, a bid amount, a termination point, a daily maximum, and a time stamp (i.e., record last updated), and external data (e.g., Carfax.com data). A user interface allows the marketer to control PPC values and budgets. There are many ways for a user to control PPC values (e.g., programmatically, selectively, overriding, rules, algorithms, etc.).

In one embodiment, a historical data module (not shown in drawing) collects and aggregates data of past UIOs number of displays, number of click-throughs and UIO characteristics. The data can be collected on a per-click real-time basis or be periodically uploaded. Historical data can be categorized by characteristics. Some embodiments operate within the remote advertisement server 110 and others embodiments operate externally on dedicated servers. An embodiment stores the historical data or analysis thereof within the uniquely identifiable database 220.

Advertisements can be indexed in the uniquely identifiable object database 220 according to identification data. The identification data can be, for example, unique identification codes, serial numbers, VINs, addresses, or any other appropriate data to uniquely identify each object. The objects can be distinguished even if manufactured to the same specifications. In one implementation, VINs are not available for cars manufactured prior to 1981, so a unique identification code can be generated. The method for generating the code can be made available to a publisher to utilize locally and/or alternatively, recipients of the generated code can be provided a key. Other data can also be sent along with the identification data. If an advertisement is an enriched listing, information can be downloaded ahead of time (e.g., multimedia files).

Additionally, advertisement identifiers can be stored in a record. The advertisement identifiers are used as pointers to online advertisements stored either locally or on a separate advertisement server. In further details of the local storage implementation, online advertisements can be stored in the uniquely identifiable object database 220. Each online advertisement can include characteristics for matching against uniquely identifiable objects. For example, a certain car model and a range of years can be specified as appropriate for a CarFax online advertisement. In U.S. application Ser. No. 12/523,703, techniques for populating a uniquely identifiable object database are described in further detail.

The publisher interface 230 communicates with search engines concerning sponsored search results or sponsored advertisements (e.g., eligibility of advertisements). In a first instance, the publisher interface 230 provides listings from the uniquely identifiable object database 220 to include in SERPs. In an embodiment, identification data for the listings are provided in batch during overnight data transfers. The listings can be updated during specified intervals between batch transfers. For example, VINs, bids, and other data for automobiles can be provided to a website like Lemonfree.com or Amazon.com.

The network module 240 provides lower-level interfaces with external devices such as remote search engines. The network module 240 translates commands sent and received according to a specific protocol or API (application programming interface). Moreover, network cards manage the transmission of data over a network with the external devices using IEEE standards.

Figure 4:
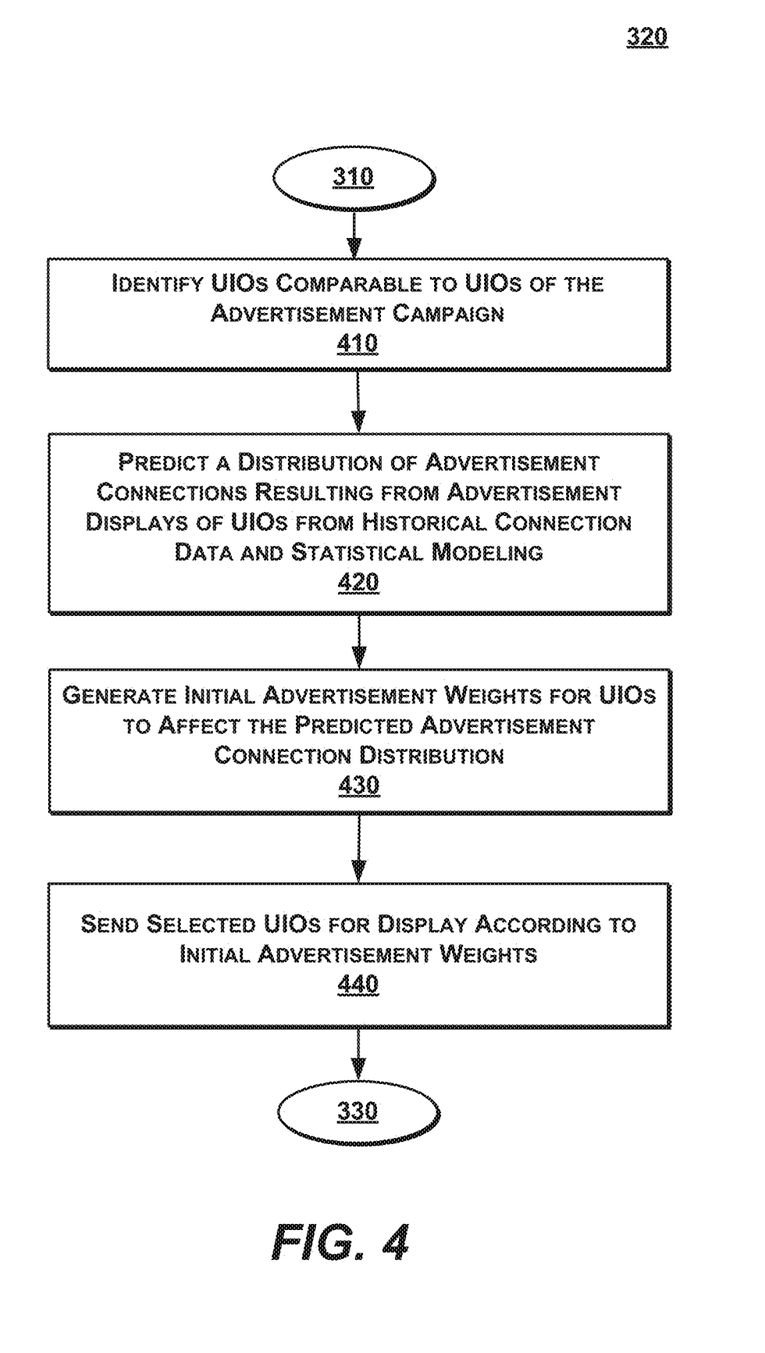
FIG. 4 is a flow diagram illustrating a step of determining initial connection weights based on a cold-start prediction of connections for the method of FIG. 3, according to one embodiment.
Figure 5:
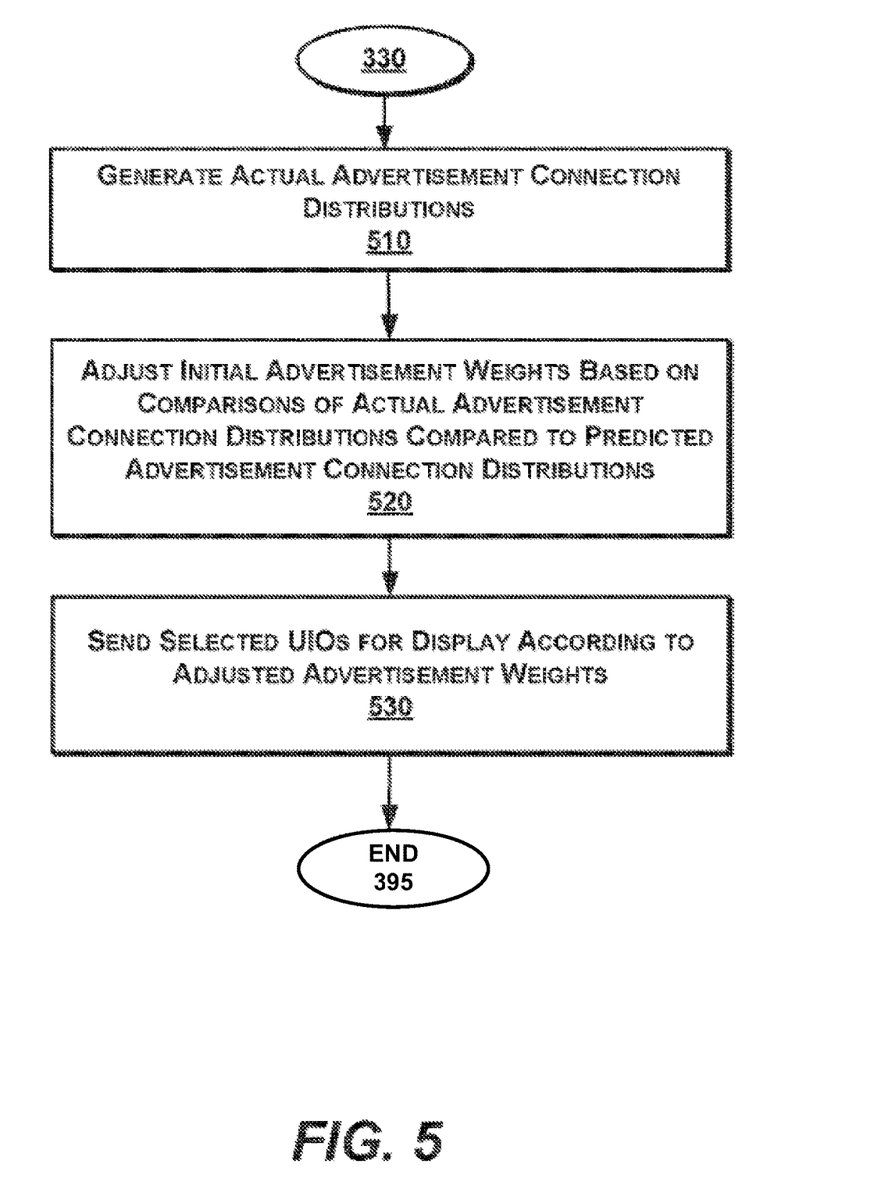
FIG. 5 is a flow diagram illustrating a step of adjusting initial connection weights for the method of FIG. 3, according to one embodiment.

II. Connection Steering Methods (FIGS. 3-5)

Figure 3:
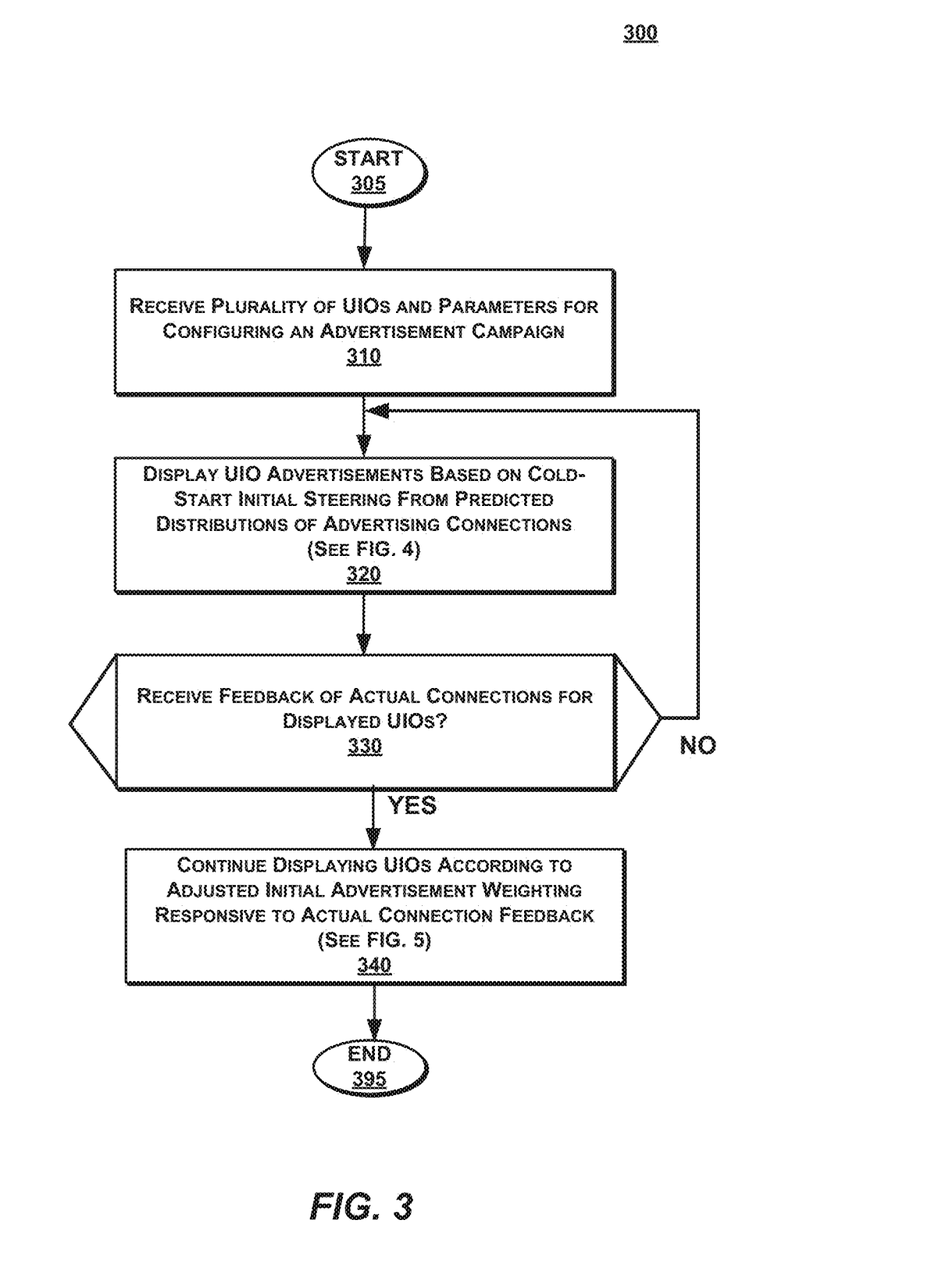
FIG. 3 is a flow diagram illustrating a method for steering distributions for connections for advertisement campaigns of UIOs based on predicted distributions, according to one embodiment.

FIG. 3 is a flow diagram illustrating a method 300 for steering distributions for connections from advertisement campaigns of UIOs based on predicted distributions, according to one embodiment. The method 300 can be implemented by, for example, the remote advertisement server 110 of FIG. 1. In some instances, the method 300 may start at 305.

At step 310, a plurality of UIOs and parameters for configuring an advertisement campaign are received. Marketers can log-on and upload individual or batch lists of UIOs. Also, web crawlers can automatically pull UIOs from a dealer web site. Web site pages for particular UIOs can be abstracted to a template for improved data scraping. Additionally, information and UIOs can be received from feeds.

At step 320, UIO advertisements are displayed based on a cold-start mode utilizing a predicted distribution of advertisement connections. Additional details are described below with respect to FIG. 4.

At step 330, when feedback of actual connections for displayed UIOs is received, at step 340, UIO display is continued with adjustments to initial advertisement weightings responsive to statistics of the actual connection feedback, as is described below in association with FIG. 5. In some instances, the method 300 may end at 395.

FIG. 4 is a flow diagram illustrating the step 320 of determining initial advertisement weights based on a cold-start prediction of advertisement connections for the method of FIG. 3, according to one embodiment.

At step 410, UIOs comparable to the UIOs of the advertisement campaign are identified. Characteristics of a house are use in one example to identify, for example, other houses that are brick, within a certain area, have a certain age, include a garage, or any combination of characteristics. In one case, a score indicates close a UIO is to one or more other UIOs. The comparisons can be made as a whole, or with respect to a specific characteristic.

At step 420, a distribution of advertisement connections is predicted by advertisement displays. The distribution can be formed by statistical analysis of historical connection data from similar UIOs. A stochastic process library can store modeling data for Gaussian processes, Markov processes, Bernoulli processes, and the others.

At step 430, initial connection weights are generated for UIOs to affect the predicted connection distribution. A marketer may not have a high enough budget to support some predicted exposure levels. Charges or fees can also relate to predictions.

Figure 6A:
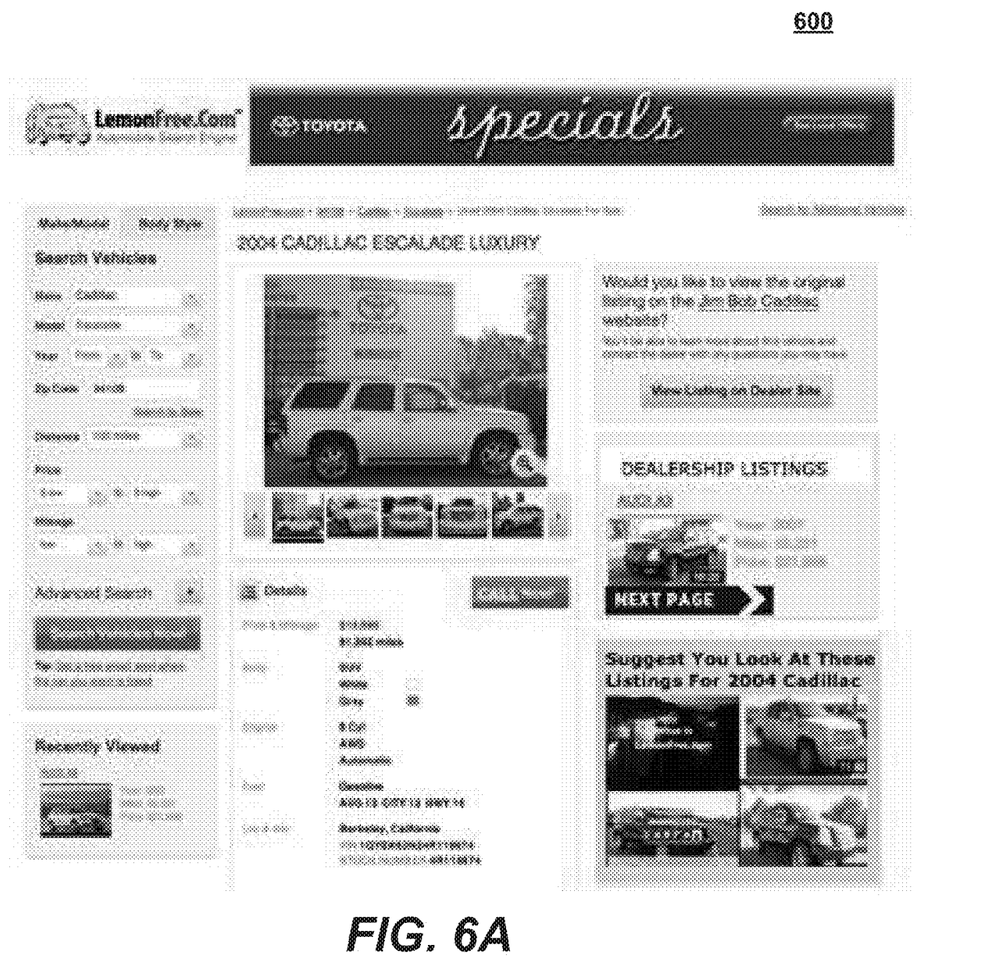
FIGS. 6A-B are schematic diagrams illustrating web pages with exemplary online advertisement displays of uniquely identifiable objects, according to some embodiments.
Figure 6B:
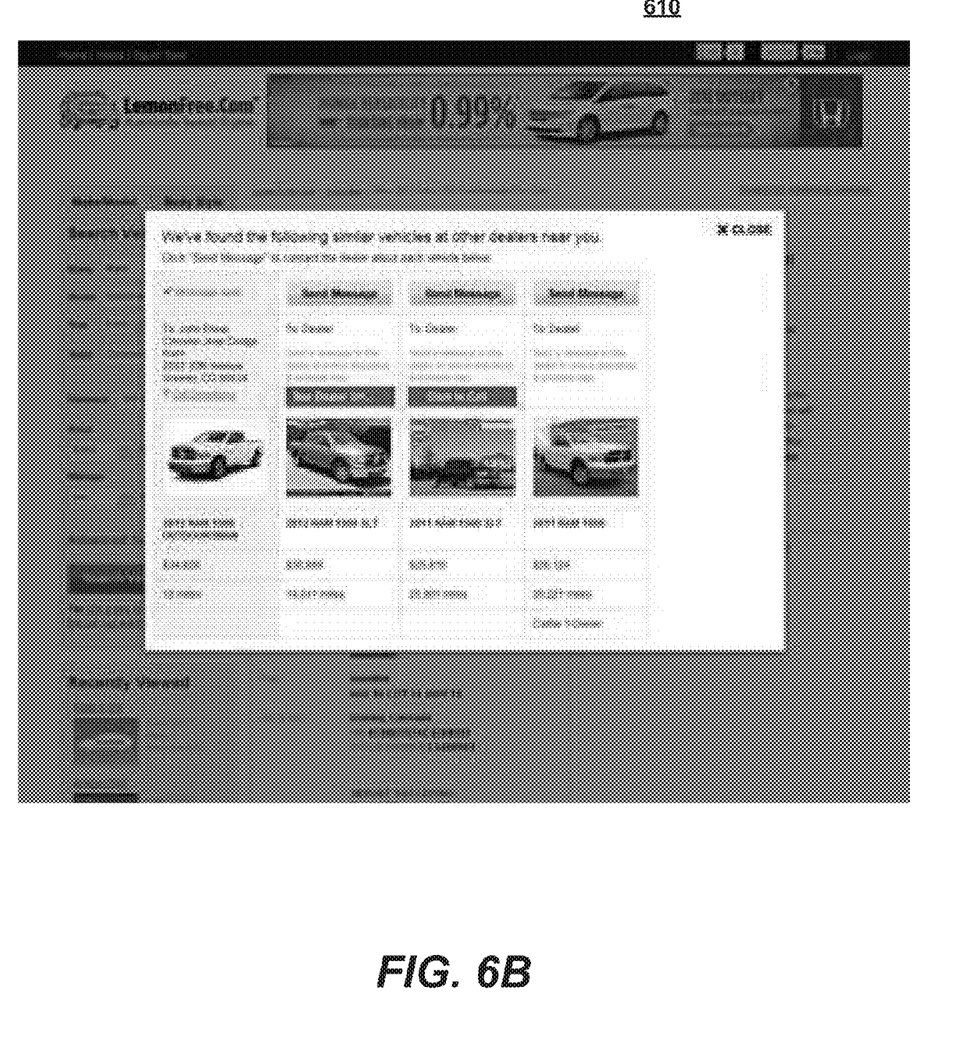
Figure 6C:
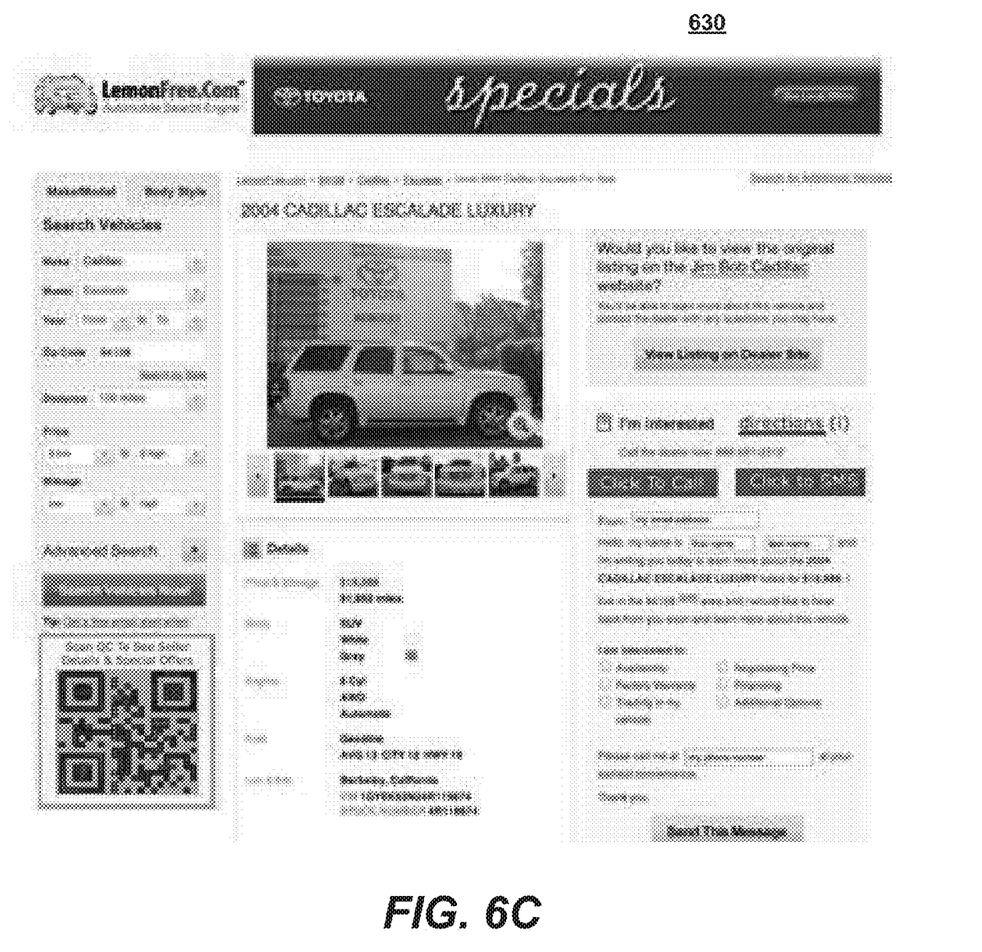
FIGS. 6C-D are schematic diagrams illustrating web pages with exemplary connections for the online advertisements of uniquely identifiable objects, according to some embodiments.
Figure 6D:
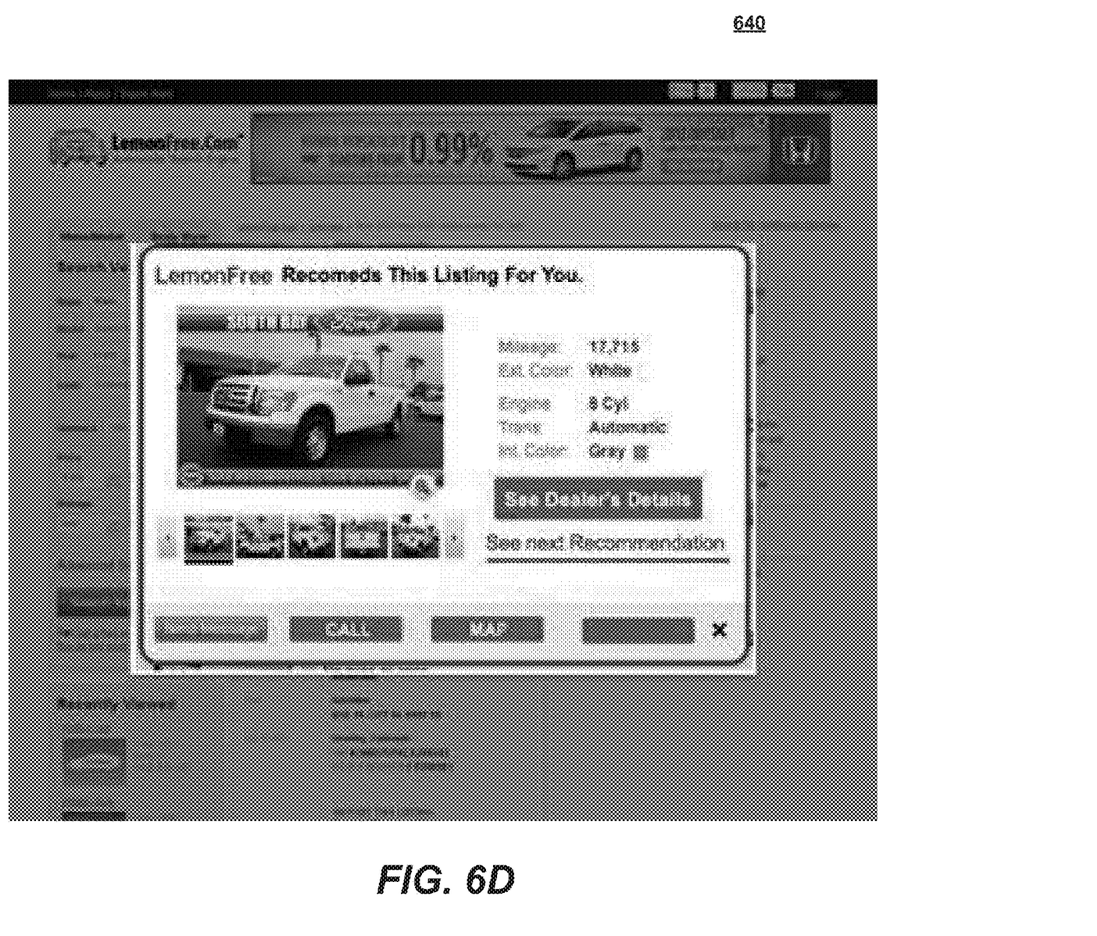

At step 440, selected UIOs are sent for display according to initial advertisement weights. The online advertisement can be displayed numerous different ways. In one example, display is integrated with a web page (e.g., SERP results). In another example, display is separated into a separate web page, tab, or shadow box as shown in the graphical displays 600 and 610 shown in FIGS. 6A-B, respectively. Display of various termination points are shown in the graphical displays 630 and 640 shown in FIGS. 6C-D, respectively.

Additional display examples include a banner (static or dynamic rotational) or a container (e.g., an ad box) of a web page. In the ad box, one or more uniquely identifiable object listings are displayed along with one or more PPC termination. In still another example, the advertisement can be displayed outside of the browser, such as directly on a desktop or within an application window.

A user is connected to a connection medium (e.g., a termination point or connection data) associated with the sponsored advertisement. In a preferred embodiment, the termination point is a URL (Universal Resource Locator) reachable through a network. Other exemplary termination points include maps or an address with directions, instantiation of instant messenger boxes connecting a customer to a marketer, a telephone number, SMS message, e-mail message, and the like.

In an embodiment, connecting a consumer to a termination point, includes displaying an online advertisement is displayed until selected by a user. In some instances, the online advertisement rotates among other online advertisements, or reaches a time out. In other instances, a browser window containing the advertisement can be closed. Different termination points can vary in PPC values. The user clicks are recorded in real-time, the updates of available advertisements can be provided in substantially real-time or in periodic batches (e.g., hourly or daily) and those batches can be updated locally based on the publisher's schedule. If authorization is not given due to an expired budget, execution of the termination point can be denied. In this case, a default termination point can be substituted, or the user can simply receive an exception message. If the PPC budget has not been expired, authorization to direct the user to a termination point or otherwise make available the sponsored connection method associated with the advertisement is received. In some cases, the termination point is sent with the online advertisement. In other cases, the termination point is sent upon selection (e.g., a dynamic termination point).

FIG. 5 is a flow diagram illustrating the step 340 of adjusting initial connection weights for the method of FIG. 3, according to one embodiment.

At step 510, a distribution of actual connection is generated.

At step 520, one or more initial connection weights can be adjusted based on comparisons of actual connection distributions compared to predicted advertisement connection distributions.

At step 530, selected UIOs are sent for display in accordance with adjusted connection weights. The same displays of FIGS. 6A-6D are examples of output to consumers.

III. Computing Devices (FIG. 7)

Figure 7:
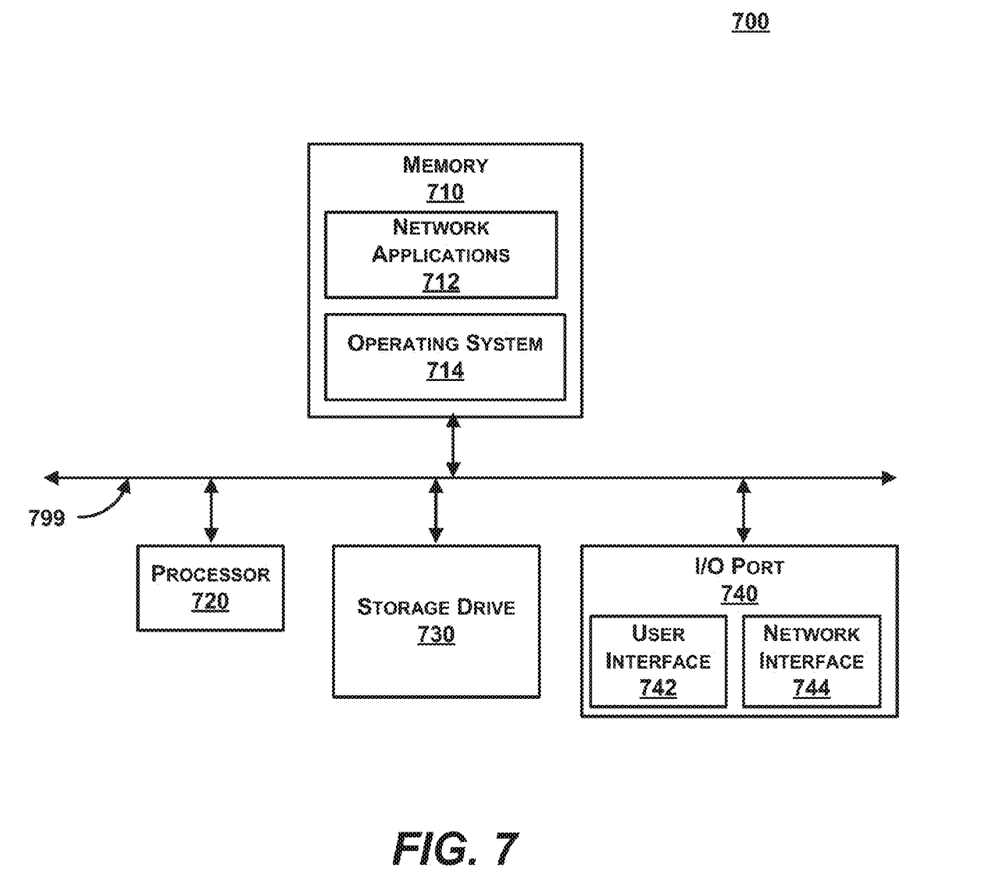
FIG. 7 is a block diagram illustrating an exemplary computing device, according to one embodiment.

FIG. 7 is a block diagram illustrating an exemplary computing device 600 for use in the system 100 of FIG. 1, according to one embodiment. The computing device 600 is an exemplary device that is implementable for each of the components of the system 100, including the remote advertisement server 110, the publisher 120, the sponsor web site 130, and the consumer 140. Additionally, the system 100 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 799. Communication can be digital and/or analog, and use any suitable protocol.

The memory 710 further comprises network applications 720 and an operating system 714. The network applications 712 can include the modules of advertisement server 110 of FIG. 2. Other network applications can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Widows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method at a connection management server for steering distributions for UIO (uniquely identifiable object) connections based on predicted connections, the method comprising the steps of:
receiving data describing a plurality of UIOs and parameters for configuring an online advertisement campaign for the plurality of UIOs;
automatically identifying UIOs comparable to each of the plurality of UIOs of the online advertisement campaign;
predicting a distribution of connections resulting from displaying graphical advertisements describing the plurality of UIOs of the online advertisement campaign with one or more webpages associated with the identified comparable UIOs based on historical information of connections for the identified comparable UIOs, the graphical advertisements including a hyperlink that, when selected, connects a browser with a termination point associated with a selected UIO;
automatically generating an initial connection weight for each of the plurality of UIOs, wherein the initial connection weight affects how often the graphical advertisement for an associated UIO is displayed as part of an online advertisement;
serving the graphical advertisements for the plurality of UIOs for display in association with the one or more webpages on one or more computing devices according to the initial connection weights;
receiving data describing inputs associated with the graphical advertisements sent for display on the one or more computing devices for each of the plurality of UIOs and generating an actual connection distribution based on the data describing the inputs;
responsive to the actual connection distribution, adjusting at least part of the initial connection weights based on a comparison of the actual connection distribution to the predicted distribution of connections; and
serving the graphical advertisements for the plurality of UIOs for display in association with the one or more webpages on the one or more computing devices at a frequency according to the adjusted initial connection weights.

2. The method of claim 1, wherein the online advertisement campaign indicates a separate PPC (pay-per-click) budget for each of the plurality of UIOs, and wherein the automatically generated initial connection weights compensate a predicted amount of advertisement connections according to the PPC budget available for advertisement connections.

3. The method of claim 1, further comprising:
identifying comparable UIOs and retrieving the historical information of connections for the comparable UIOs from a database,
wherein the predicted distribution of connections is based on retrieving the historical information of connections for comparable UIOs from the database.

4. The method of claim 1, further comprising:
calculating a likelihood of a connection relative to other advertisements of a plurality of advertisements based on a statistical model,
wherein the predicted distribution of connections is based on the calculated likelihood.

5. The method of claim 1, further comprising:
receiving a target distribution of connections from a marketer device,
wherein the initial connection weights are based at least in part on the target distribution.

6. The method of claim 1, further comprising:
sending an indication of at least one of automatically generated initial connection weights to a marketer device; and
subsequently receiving a target distribution of connections from the marketer device,
wherein the adjusted initial connection weights are based on the target distribution.

7. The method of claim 1, wherein actual connections feedback is received from more than one of a plurality of independent publisher devices that have displayed one or more of the UIOs as part of a sponsored advertisement to a user of a publisher web site.

8. The method of claim 1, wherein actual connections feedback is received from one or more of a plurality of publisher devices that have displayed one or more of the UIOs as part of a sponsored advertisement to a user of a publisher web site, wherein the sponsored advertisement comprises more than one UIO selected in response to an action by the user of the publisher web site, wherein the selected more than one UIO were provided by more than one of a plurality of independent marketer devices.

9. The method of claim 1, wherein the predicted distribution of connections is based on characteristics of the comparable UIO.

10. The method of claim 1, wherein the plurality of UIOs comprise one of uniquely-distinguished vehicles, real estate, and articles.

11. The method of claim 1, wherein the plurality of UIOs comprise individually-distinguished vehicles, and the predicted distribution of connections comprises forwarding a user of a publisher website to a vehicle description page of an individually-distinguished vehicle, and the predicted distribution of connections is based on characteristics of the individually-distinguished vehicles, the characteristics of the individually-distinguished vehicles comprising one or more of a make, a model, a year, a color, mileage, and location.

12. The method of claim 1, wherein the historical information comprises a ratio of advertisement displays to actual connections for each of the comparable UIOs.

13. The method of claim 1, wherein a connection is counted in response to forwarding a user of a publisher web site to a deep linked web site page specific to a UIO.

14. The method of claim 1, wherein a connection results from selection by a user of one of a plurality of connection options, wherein the connection options comprise one or more of a web site page hyperlink, a mapping hyperlink, an e-mail hyperlink, a telephone number hyperlink, and an SMS hyperlink.

15. The method of claim 1, wherein the UIOs are provided by a plurality of marketers and the UIOs are displayed as advertisements by a plurality of publishers that are independent of the connection management server, and wherein the connection management server comprises an advertisement exchange server between the plurality of marketers and the plurality of publishers.

16. A non-transitory computer-readable medium storing source code that, when executed by a processor, performs a method in a connection management server for steering distributions for UIO (uniquely identifiable object) connections based on predicted connections, the method comprising the steps of:

receiving data describing a plurality of UIOs and parameters for configuring an online advertisement campaign for the plurality of UIOs;

automatically identifying UIOs comparable to each of the plurality of UIOs of the online advertisement campaign;

predicting a distribution of connections resulting from displaying graphical advertisements describing the plurality of UIOs of the online advertisement campaign with one or more webpages associated with the identified comparable UIOs based on historical information of connections for the identified comparable UIOs, the graphical advertisements including a hyperlink that, when selected, connects a browser with a termination point associated with a selected UIO;

automatically generating an initial connection weight for each of the plurality of UIOs, wherein the initial connection weight affects how often the graphical advertisement for an associated UIO is displayed as part of an online advertisement;

serving the graphical advertisements for the plurality of UIOs for display in association with the one or more webpages on one or more computing devices according to the initial connection weights;

receiving data describing inputs associated with the graphical advertisements sent for display on the one or more computing devices for each of the plurality of UIOs and generating an actual connection distribution based on the data describing the inputs;

responsive to the actual connection distribution, adjusting at least part of the initial connection weights based on a comparison of the actual connection distribution to the predicted distribution of connections; and serving the graphical advertisements for the plurality of UIOs for display in association with the one or more webpages on the one or more computing devices at a frequency according to the adjusted initial connection weights.

17. A connection management server for steering distributions for UIO (uniquely identifiable object) connections based on predicted connections, the connection management server comprising:

a processor;

a network interface; and a memory communicatively coupled to the processor and the network interface and storing:

a first module to receive data describing a plurality of UIOs and parameters for configuring an online advertisement campaign for the plurality of UIOs;

a second module to automatically identify Ms comparable to each of the plurality of UIOs of the online advertisement campaign;

a third module to predict a distribution of connections resulting from displaying graphical advertisements describing the plurality of Ms of the online advertisement campaign with one or more webpages associated with the identified comparable UIOs based on historical information of connections for the identified comparable UIOs, the graphical advertisements including a hyperlink that, when selected, connects a browser with a termination point associated with a selected UIO; and a fourth module to automatically generate an initial connection weight for each of the plurality of UIOs, wherein the initial connection weight affects how often the graphical advertisement for an associated UIO is displayed as part of an online advertisement, wherein the first module serves the graphical advertisements for the plurality of UIOs for display in association with the one or more webpages on one or more computing devices according to the initial connection weights, wherein the first module receives data describing inputs associated with the graphical advertisements sent for display on the one or more computing devices for each of the plurality of UIOs and generating an actual connection distribution based on the data describing the inputs, and wherein the fourth module, responsive to the actual connection distribution, adjusts at least part of the initial connection weights based on a comparison of the actual connection distribution to the predicted distribution of connections, and the fourth module serving the graphical advertisements for the plurality of UIOs for display in association with the one or more webpages on the one or more computing devices at a frequency according to the adjusted initial connection weights.

* * * * *

UNITED STATES PATENT AND TRADEMARK OFFICE
CERTIFICATE OF CORRECTION

PATENT NO. : 10,482,494 B2
APPLICATION NO. : 15/058127
DATED : November 19, 2019
INVENTOR(S) : Lance Timothy Schafer et al.

It is certified that error appears in the above-identified patent and that said Letters Patent is hereby corrected as shown below:

In the Claims

In Column 14, Line 15, In Claim 17, please replace "Ms" with --UIOs--

In Column 14, Line 20, In Claim 17, please replace "Ms" with --UIOs--

Signed and Sealed this
Twenty-eighth Day of January, 2020

Andrei Iancu
*Director of the United States Patent and Trademark Office*